United States Patent [19]

Lieuwen

[11] 4,237,841
[45] Dec. 9, 1980

[54] APPARATUS FOR CONTROLLING THE AIR SUPPLY TO THE INTAKE MANIFOLD OF AN INTERNAL COMBUSTION ENGINE

[76] Inventor: William O. Lieuwen, Draviklaan 16, Nuenen, Netherlands

[21] Appl. No.: 865,823

[22] Filed: Dec. 30, 1977

Related U.S. Application Data

[63] Continuation-in-part of Ser. No. 640,120, Dec. 12, 1975, abandoned.

[30] Foreign Application Priority Data

Dec. 18, 1974 [NL] Netherlands ..................... 7416472

[51] Int. Cl.³ ............................................. F02M 23/04
[52] U.S. Cl. ..................................... 123/585; 261/63
[58] Field of Search ........... 123/124 B, 119 D, 124 R; 261/63

[56] References Cited

U.S. PATENT DOCUMENTS

| | | | |
|---|---|---|---|
| 1,667,016 | 4/1928 | Stokes | 123/124 B |
| 1,918,913 | 7/1933 | Isdahl | 123/124 B |
| 2,617,398 | 11/1952 | Taber | 123/124 B |
| 2,724,375 | 11/1955 | Schaffer | 123/119 D |
| 3,599,426 | 8/1971 | Oberdorfer | 123/119 D |
| 3,626,915 | 12/1971 | Nakajima | 123/119 D |
| 3,970,052 | 7/1976 | Andoh | 123/119 D |

FOREIGN PATENT DOCUMENTS

| | | | |
|---|---|---|---|
| 2631020 | 1/1977 | Fed. Rep. of Germany | 123/124 B |
| 554374 | 7/1943 | United Kingdom | 123/124 B |

*Primary Examiner*—Ronald H. Lazarus
*Attorney, Agent, or Firm*—A. C. Nolte, Jr.; Edward B. Hunter; John P. McGann

[57] ABSTRACT

Apparatus for controlling the air supply to the intake manifold of an internal combustion engine having an intake system comprising a carburetor, the carburetor having a throttle, means for admitting air from the atmosphere and conducting the air to the carburetor for mixing with fuel, and conduit means for conducting the mixture of air and fuel from the carburetor to the intake manifold, the apparatus comprising auxiliary conduit means for conducting fuel—free air into the engine, the auxiliary conduit means communicating with the intake system at a point downstream of the throttle, a displaceable member associated with the auxiliary conduit means, the displaceable member being displaceable between a position in which the member blocks the access of air from the auxiliary conduit to the intake manifold and positions in which the member at least partly opens access of air from the auxiliary conduit to the intake manifold, an electromagnet associated with the displaceable member for controlling the displacement of the member, means for controlling the energization of the electromagnet, the energization controlling means including at least one switch responsive to pressure variations occurring in the intake system, and means for transmitting pressure variations from the intake system to the pressure responsive switch thereby to actuate the pressure responsive switch.

14 Claims, 8 Drawing Figures

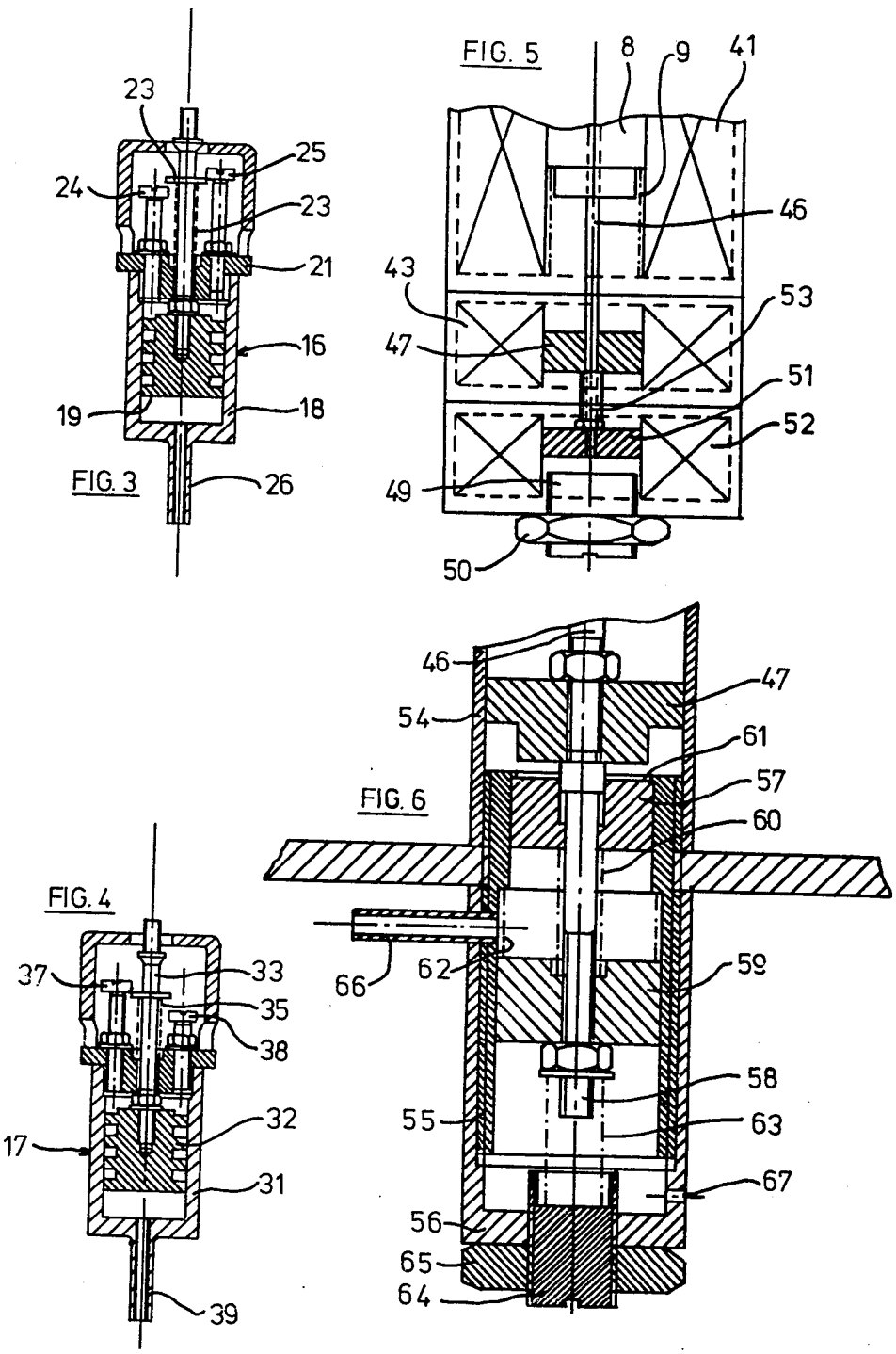

FF = FLIP-FLOP

APPARATUS FOR CONTROLLING THE AIR SUPPLY TO THE INTAKE MANIFOLD OF AN INTERNAL COMBUSTION ENGINE

This application is a continuation-in-part application of co-pending application Ser. No. 640,120 filed Dec. 12, 1975 and now abandoned.

BACKGROUND OF THE INVENTION

The invention relates to a device for controlling the air supply to the inlet manifold of a combustion engine at a point located downstream of the throttle valve of the carburetor.

A combustion engine, particularly a gasoline engine used in a motor car frequently operates under conditions in which an excessive quantity of fuel is supplied for the required operation of the engine, which involves an excessively high fuel consumption and/or polution of the air.

If, for example, the number of revolutions of the engine in accelerating the vehicle is raised to about 3000 rev./min. and the clutch is subsequently loosened for changing over to a higher gear, the throttle is closed and the subatmospheric pressure in the inlet branch pipe downstream of the throttle generally attains a value which even exceeds that at a standstill of the rotating engine. Then a great pressure difference is created across the stationary fuel supply device, which thus delivers an unnecessarily large quantity of fuel. A fairly large portion of this fuel will leave the engine without being burnt and thus contribute to pronounced pollution of the air or this fuel is at least partly deposited in the inlet manifold and is again carried along at the subsequent opening of the throttle and hence at an increase in the quantity of air flowing through the inlet manifold, the fuel thus leaving the engine again without being combusted. Under these and similar conditions it is desirable to supply additional air downstream of the throttle in order to act upon the pressure difference across the throttle so that on the one hand undesirable and unnecessary supply of fuel is avoided at the instants when no power is required from the engine and on the other hand the ratio of air and fuel flows, is acted upon to effect a reduction of the fuel consumption of the engine and reduce air pollution.

According to the invention this can be achieved by providing the device with a closing member included in an air supply channel, the displacement of said member being controlled by at least one electromagnet, the energization of which is controlled by means of at least one switch responding to pressure variations occurring in the inlet system of the engine.

By using at least one switch determining the energization of an electromagnet actuating the closing member, pressure variations occurring in the inlet system are prevented from directly acting upon the displacement of the closing member, since otherwise undesirable or inadequate displacements of the closing member might be involved.

The invention will now be described more fully with reference to a few embodiments as illustrated in the accompanying drawings.

FIG. 3 is a schematic sectional view of a first switch.

FIG. 4 is a schematic sectional view of a second switch.

FIG. 5 shows schematically a further embodiment of the electromagnet disposition for actuating the closing member.

FIG. 6 shows a third embodiment of the mechanism actuating the closing member.

Figure 1:
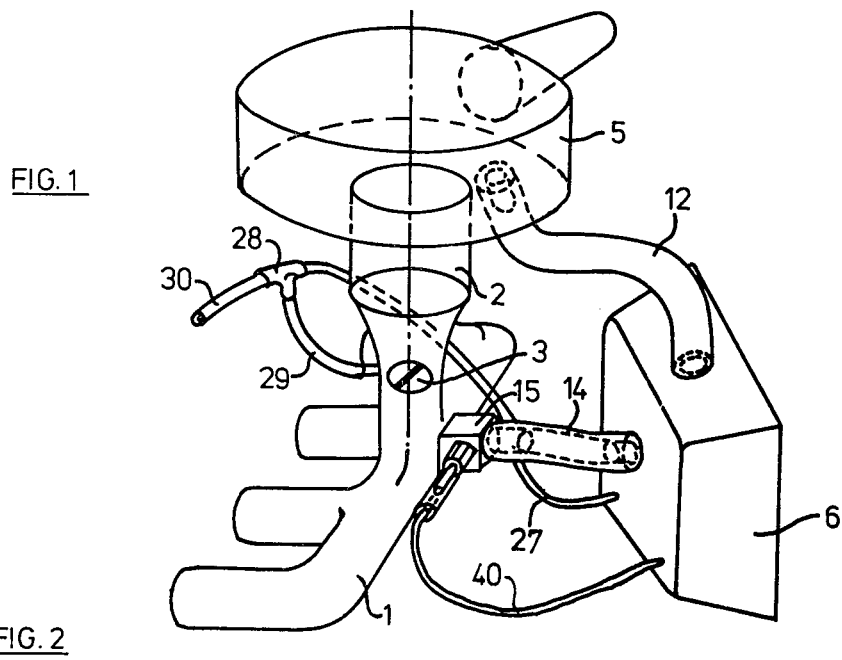
FIG. 1 shows schematically part of the inlet system of a combustion engine with a device according to the invention coupled herewith.

FIG. 1 shows schematically the inlet manifold 1 of a gasoline engine provided with a carburetor 2 (shown schematically), and in a conventional manner a throttle 3 is arranged between the carburetor and the inlet manifold. The carburetor is provided with an air filter 5 of known type.

A box 6 arranged near the engine accommodates a closing member formed by a housing 7 accommodating a slide 8. A compression spring 9, arranged in the housing 7, tends to urge the slide 8 upwards against the bottom end of a connecting piece 10 screwed into the top of the housing and adapted to be fixed in any desired position by means of a nut 11 screwed onto the outer side of the connecting piece 10.

The connecting piece 10 has connected with it one end of an air hose 12, the other end of which is connected with the air filter 5. As an alternative a separate air filter may be provided on the connecting piece 10.

Figure 2:
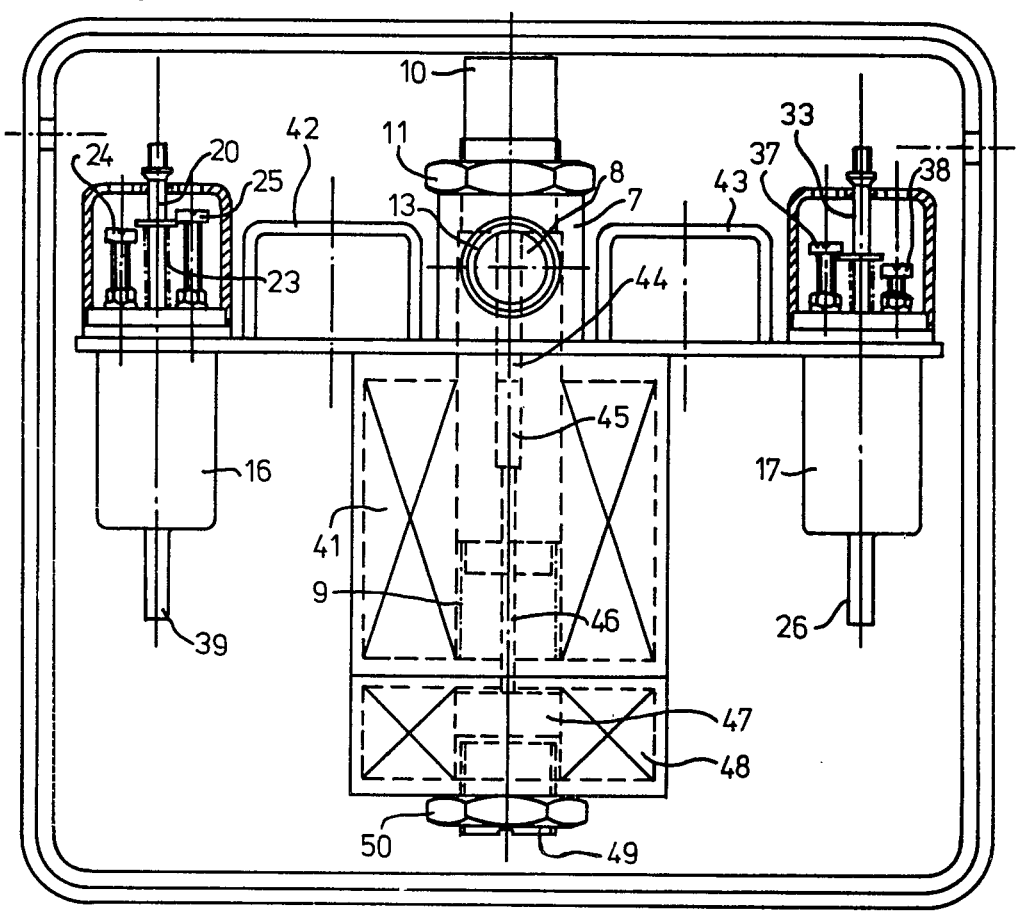
FIG. 2 shows schematically the arrangement of the closing member and two switches actuating the closing member.
Figure 7:
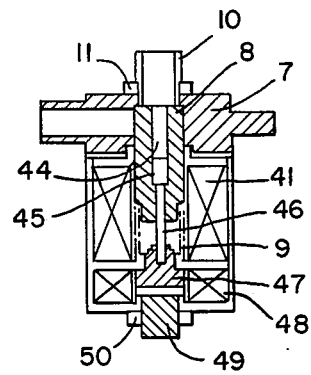
FIG. 7 is a cross-sectional view of the slide housing of FIG. 2.

The housing 7 is furthermore provided with a connecting stud 13, the passage of which is shut completely or substantially completely in the position of the slide 8 shown in FIG. 2 and FIG. 7. The connecting stud 13 has connected with it a hose 14, which causes the stud 13 to communicate with a connecting piece 15 fastened to the inlet manifold 1.

On either side of the closing member the box contains two switches 16 and 17. The switch 16 is shown in detail in FIG. 3 and comprises a substantially cylindrical housing 18 holding a piston 19. The piston 19 has secured to it a rod 20, which is passed through a lid 21 closing the housing. The rod 20 is surrounded by a compression spring 22, which is enclosed between the lid 21 and an annular plate 23 secured to the rod 20. The plate 23 is adapted to reciprocate between two contact pins 24 and 25 adjustably arranged in the lid.

The housing 18 is furthermore provided with a connecting spout 26 for receiving an air hose 27 (FIG. 1), which communicates through a T-joint 28 and an air hose 29 with the inlet system at a point located just above the throttle 3, when the throttle 3 is closed. the T-joint has a further air hose 30, which is connected in known manner with the mechanism controlling the pre-ignition of the engine.

The switch 17 shown in FIG. 4 is constructed in a manner similar to switch 16, and it comprises a housing 31 accommodating a piston 32. The piston has secured to it a rod 33, which is passed through a lid 34 covering the housing. The rod 33 is surrounded by a compression spring 35 which is enclosed between the lid 34 and an annular plate 36 fastened to the rod 33. The plate 36 is adapted to reciprocate between two adjustable contacts 37 and 38 secured to the lid 34.

The housing 31 is furthermore provided with a connecting piece 39 for one end of a hose 40, the other end of which is connected with the connecting piece 15.

It will furthermore be apparent from FIG. 2 that the slide 8 is surrounded by a coil 41, which can be energized through a bi-stable switch 42.

At its center the slide 8 has a stepped bore 44, the portion of the bore having the larger diameter receiving the thickened top end 45 of a rod 46 passed through the bore 44, the end of the rod projecting beneath the slide 8 being connected with a piston-like body 47, which constitutes an armature for an auxiliary coil 48 arranged beneath the coil 41. The auxiliary coil 48 can be energized through a bi-stable switch 43.

The stroke which the armature 47 can perform with the aid of the auxiliary coil 48 is adjustable by means of an adjustable stop 49, which can be fixed in place by means of a safety nut 50.

The system described in the foregoing operates as follows.

If at a stationary speed the supply of additional air to the inlet manifold is not required, the switch 16 may be adjusted so that the plate 23 engages the contact 25, whereas the plate 36 is just free of the contact 38 when the engine is rotating in a standstill. When the throttle is slightly opened, the resulting expansion of the combustion air downstream of the throttle will cause the mixture to be enriched. However, at the opening of the throttle the subatmospheric pressure at the junction of the duct 29 and hence the subatmospheric pressure beneath the piston 19 in the housing 18 of the switch 16 will increase so that the piston 19 moves downwards and the plate 23 establishes a contact with the contact 24. Thus, current is applied to the bi-stable switch 43, which results in the energization of the auxiliary coil 48 so that the armature 47 and hence the slide 8 are moved downwards over a small distance. Thus part of the passage 13 is opened and air sucked in through the filter and the duct 12 can flow through the duct 14 towards the inlet manifold so that the harmful effect of an excessively rich mixture is reduced.

When the throttle is opened further and the speed of the engine increases, the subatmospheric pressure in the inlet manifold and hence the subatmospheric pressure beneath the piston 32 in the housing 31 of the switch 17 will gradually decrease so that the piston 32 can move upwards by the action of the spring 35 until the plate 36 engages the contact 37. When this contact is established, a pulse is applied to the bi-stale switch 43, which results in the suppression of the energization of the auxiliary coil 48 so that the slide 8 can move into its closed position. As a result, the supply of additional air to the inlet manifold is interrupted under such operational conditions of the engine as to guarantee a satisfactory mixing of air and fuel in a satisfactory ratio and a satisfactory combustion.

When changing over to another gear or when braking the vehicle by means of the engine, the number of revolutions of the engine will be comparatively high at the instant of closing of the throttle. When the throttle is closed, at least initially a subatmospheric pressure will be produced in the inlet manifold downstream of the throttle in excess of the subatmospheric pressure produced in stationary operation. Owing to this subatmospheric pressure the piston 32 of the switch 17 will move downwards until the plate 36 comes into contact with the contact 38, whereas owing to the decrease in subatmospheric pressure beneath the piston 19 of the switch 16, this piston 19 has again moved upwards so that the plate 23 engages the contact 25. The establishment of contact between the plate 23 and the contact 25 completes the current supply to the bi-stable switch 42, and the establishment of contact with the plate 36 and the contact 38 produces a pulse for the bi-stable switch 42 so that the main coil 41 is energized and the slide 8 is withdrawn, the passage 13 being completely opened, as a result of which a large quantity of air can flow towards the inlet manifold, the subatmospheric pressure in the inlet manifold being thus considerably decreased, which involves also a material reduction of the fuel supply not required under the operational conditions concerned and as the case may be, said supply may even be completely stopped.

As long as the switch 16 remains in the last-mentioned position, i.e. the plate 23 engaging the contact 25, the bi-stale switch 42 not receiving a further pulse, the coil 41 remains energized so that, if due to a decrease in subatmospheric pressure in the inlet branchy pipe the contact between the plate 36 and the contact 38 would be eliminated, the supply of additional air to the inlet manifold in nevertheless maintained.

In order to prevent the engine from cutting out, for example, when braking the vehicle by means of the engine to a standstill, an electronic system (not shown) is provided, which is operative in dependence upon the speed of the engine, said electronic system being, for example, arranged so that it responds to the number of pulses of the coil per unit time and generates a pulse to the bi-stable switch 42, when a given minimum speed is attained, so that the energization of the coil 41 is obviated and the slide 8 is moved back into the closed position by the spring 9.

If the throttle is re-opened after the change-over, the increase in the subatmospheric pressure in the housing 18 of the switch 16 will cause the piston 19 to move downwards so that the contact between the dish 23 and the contact 25 is interrupted. The current supply to the coil 41 is thus suppressed so that the slide 8 will again be moved into the closed position by the spring 9.

In order to obtain a very poor mixture in the state of stationary operation without adversely affecting the engine operation under other operational conditions, the signal generated by the electronic system (not further defined) when the given minimum speed is attained, is employed not only for preventing the coil 41 from being energized but also for energizing the auxiliary coil 48 only in state of stationary operation. The part of the passage 13 thus opened serves as a basic opening for the other operational conditions in which the auxiliary coil 48 is energized, which means that the stop 49 is adjusted so that at the stationary speed quiet running of the engine is nevertheless ensured with a partly opened passage of the connecting stud 13 owing to the action of the auxiliary coil. In the case of high engine speeds, for example, of a number of revolutions of 3500 to 4000 a minute and higher, the supply of additional air will be desirable in order to ensure an optimum combustion of the whole quantity of fuel. At these speeds a compulsory opening of the slide 8 over a given distance can be carried out with the aid of an electronic circuit (not shown) also responding to the engine speed and, for example, also being operative in dependence upon the number of pulses of the coil, said circuit supplying a current to the bi-stable switch 43 at a speed exceeding 3000 to 3500 rev./min., so that the auxiliary coil 48 is energized and the slide 8 is drawn downwards by means of the armature 47, the connecting stud 13 being thus again partly opened. When the speed of the engine drops below said number of revolutions, the current to the bi-stable switch and the coil 48 will again be interrupted, so that the slide 8 can return to its closed position.

When, as stated above, the slide 8 has been opened over a given distance with the aid of the auxiliary coil 48 and the armature 47 in the case of a comparatively high speed, the rate of supply of additional air through the connecting piece 10 and the connecting stud 13 will increase at a further increase of speed, so that the pressure exerted on the end of the slide 8 increases to an extent such that it can be urged downwards against the action of the spring 9 until in the passage the critical speed is attained and a state of equilibrium is established between the resultant of the force produced by the dynamic pressure on the end of the slide 8 and the force of the spring 9.

In certain cases it may be desirable to open the slide 8 still further for admitting a larger quantity of additional air. This may be done by means of the construction shown in FIG. 5. In this figure those parts which correspond to parts of the preceding embodiment are designated by the same reference numerals. In this embodiment the armature 47 is freely slidably along the rod 46 and the lower end of the rod 46 passed through the armature 47 is provided with a piston-like body 51 forming a further armature, which is adapted to cooperate with a further auxiliary coil 52, arranged beneath the auxiliary coil 43.

The armature 47 is held at a distance from the armature 51 by means of a sleeve 53 surrounding the rod.

If the armature 43 is initially energized first, resulting in a given displacement of the slide 8 and the slide 8 being subsequently urged further down against the action of the spring 9, as stated above, the coil 52 can be energized, when a given speed is exceeded, so that the slide 8 is drawn still further downwards.

As a matter of course it is possible, particularly with engines having a larger cylinder capacity to provide several auxiliary coils of the kind set forth, which are stepwise energized upwards of a given speed during the further increase in speed in order to provide a gradual progression of the additional air supply.

Figure 8:
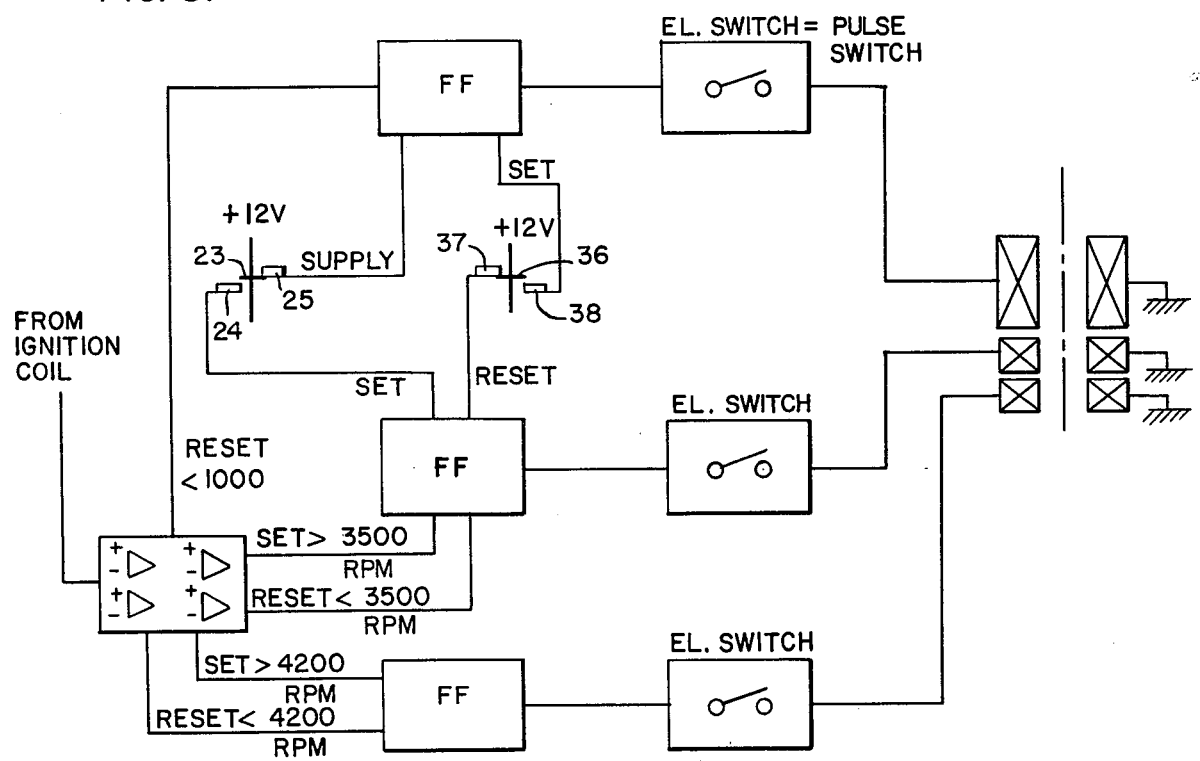
FIG. 8 is a simplified block diagram of the electrical portion of the system of the invention.

FIG. 8 illustrates, in simplified form, the electrical system of the invention, as above disclosed. In this arrangement, the bi-stable switches 42 and 43 may comprise conventional flip-flop circuits, with or without driving amplifiers as necessary in accordance with conventional practice. The outputs of these flip-flop circuits are connected to energizer coils 41 and 48, respectively.

The dishes or movable contacts 23 and 36 of the switches 16 and 17, respectively are returned to a positive supply. The contact 25 is connected to provide operating potential for the flip-flop 42, while the fixed contact 24 is connected to set the flip-flop 43. In the following paragraphs, the term "set" and "reset," refer to the triggering of the flip-flops into states such that their outputs connected to the respective coils 41 and 48 result in the energization and de-energization, respectively of the coils. The setting or resetting may, for example, be effective upon a transistion of determined polarity applied to their respective input terminals, in accordance with conventional practice.

The contact 37 of the switch 17 is connected to a rreset terminal of the flip-flop 43, while a fixed contact 38 of this switch is connected to the set terminal of the flip-flop 42.

In order to obtain triggering voltages for the flip-flops that are responsive to the speeds of the engine, conventional tachometer circuits may be employed. These tachometers may be coupled by conventional means to the engine, so that the necessary pulse output or voltage transition is effected at the conditions above described. For example, a tachometer circuit 80, providing a pulse or voltage transistion at a determined minimum speed, is connected to a reset terminal of the flip-flop 42, and to a set terminal of the flip-flop 43. A further tachometer 81, which provides a pulse or voltage transistion at a determined maximum speed is connected to a set terminal of the flip-flop 43. As discussed above, for example, the output of a tachometer may be set to occur speeds of the engine in excess of 3,500 rpm.

A further possibility of obtaining a gradual enlargement of the passage for the additional air supply to the inlet branch pipe at high speeds is illustrated in FIG. 6. The parts corresponding with those of the preceding embodiments are denoted by the same reference numerals. In this embodiment the armature 47 is arranged in a sleeve 54 surrounding said armature and being surrounded by the coil 43 (not shown). The lower end of the sleeve 54 encloses the top end of a further sleeve 55, the lower end of which is arranged in a housing 56. The top end of the sleeve 55 accomodates a piston-like body 57, which constitutes a stop cooperating with the armature 47. Through a central opening in the piston-like body 57 is passed a rod 58, the thickened head of which is slipped into a recess of the piston-like body 57 so that the piston-like body 57 cannot slip off the rod in upward direction and can hold in upward direction the piston-like body 47 at a predetermined distance from the piston-like body 57. The rod 58 can move over a given distance without taking along the piston 57. The lower end of the rod 58 is provided with a piston-like body 59. Between the piston-like body 59 and the piston-like body 57 the rod 58 is surrounded by a compression spring 60. The sleeve 55 is provided at the top with an inwardly projecting collar 61, which limits the upward movement of the piston-like body 57.

Between the piston-like body 59 and a shoulder formed in the sleeve 55 is arranged a compression spring 62.

Beneath the piston-like body 59 is arranged a compression spring 63, the lower end of which is in contact with a set bolt 64 screwed into the housing 56 and adapted to be fixed in place with respect to the housing 56 with the aid of a safety nut 65. Obviously the tension of the springs can be adjusted by turning the set bolt 64.

With the space formed between the piston-like bodies 57 and 59 in the sleeve 55 communicates a connecting stud 66, which further communicates with the inlet branch pipe of the engine through the hose 40 and the connecting piece 15.

The space beneath the piston 59 in the housing 56 is, through a bore 67 in the housing, in open communication with the atmosphere.

Normally, under operational conditions under which a high atmospheric pressure prevails in the inlet branch pipe downstream of the throttle, the thickened head of the rod 58 will hold the piston-like body (armature) 47 at a distance from the piston-like body 57, which distance diminishes according as the size of the gap opened by the slide 8 increases progressively after the energization of the auxiliary coil 48 in the range limited by the adjustable contact 24 of switch 16 and the adjustable contact 37 of switch 17.

Under conditions of comparatively high subatmospheric pressures, i.e. in the ranges in which the mixture is enriched with a slightly opened throttle and a great expansion of the combustion air directly after the throttle, the piston-like body 57 will limit a downward movement of the armature 47 in the same manner as the adjustable stop 49 of the preceding embodiments.

The setting of the various springs may then be chosen so that a decrease of the pressure in the space between the piston-like bodies 57 and 59 i.e. at an increase in speed and in excess of a given number of revolutions, when the auxiliary coil is energized, the piston-like body 59 is gradually urged downwards by the spring 62 against the force of the spring 63, the stop 57 for the armature 47 being thus gradually moved downwards, so that this armature and hence the slide 8 can also move gradually further downwards. The more the subatmospheric pressure in the inlet branch pipe decreases, the larger the distance over which the slide 8 can be displaced and the larger will be the passage opened for the additional air supply to the inlet manifold.

What is claimed is:

1. Apparatus for controlling the air supply to the intake manifold of an internal combustion engine having an intake system comprising a carburetor, the carburetor having a throttle, means for admitting air from the atmosphere and conduit means for conducting a mixture of air and fuel from the carburetor to the intake manifold, said apparatus comprising auxiliary conduit means for conducting fuel-free air into the engine, said auxiliary conduit means communicating with the intake system at a point downstream of the throttle, a displaceable closure member associated with said auxiliary conduit means, said displacement closure member being displaceable between a position in which said member blocks the access of air from the auxiliary conduit to the intake manifold and positions in which the member at least partly opens access of air from the auxiliary conduit to the intake manifold, an electromagnet associated with said displaceable member for controlling the displacement of said member, said electromagnet being actuated through a bi-stable switch controlled by means of two pressure responsive switches, a first one of said switches being connected with said intake system just upstream of the throttle and a second one of said switches being connected with the intake system just downstream of the throttle said switches being responsive to pressure variations in the regions to which they are connected, the arrangement being such that when the throttle closes and the pressure in the intake manifold drops below a predetermined value then the pressure upstream of the throttle increases the first switch is moved to a position for supplying current to said bi-stable switch and the second switch moves to a position for supplying a pulse to said bi-stable switch to energize the electromagnet to open the closure member and when the throttle is opened again due to a lowering of the pressure upstream of the throttle said first switch is moved to another position to de-energize the electromagnet and cause the closure member to move to a position to close said auxiliary conduit means.

2. Apparatus as claimed in claim 1 wherein a second bi-stable switch is provided, said second bi-stable switch being connected to actuate a second electromagnet cooperating with the closure member in such a way that the closure member is opened as pressure in the intake system upstream of the throttle drops below a predetermined value whereby said first pressure responsive switch is operated to apply a pulse to said second bi-stable switch.

3. Apparatus as claimed in claim 2 wherein said pressure responsive switch is connected to said second bi-stable switch and said second pressure responsive switch is movable to a further position for interrupting the energization of said second electromagnet when the pressure downstream of the throttle rises above a predetermined value.

4. Apparatus as claimed in claim 2 wherein the closure member is displaceable over a smaller distance by said second electromagnet than that distance over which it is displaceable by said first electromagnet.

5. Apparatus as claimed in claim 3 wherein the closure member is displaceable over a smaller distance by said second electromagnet than that distance over which it is displaceable by said first electromagnet.

6. Apparatus as claimed in claim 1 wherein an adjusting member responsive to engine speed is provided, said adjusting member being connected to said first bi-stable switch and constituting means effective, upon the occurrence of an engine speed below a predetermined limit, to apply a pulse to said first bi-stable switch and de-energize said first electromagnet.

7. Apparatus as claimed in claim 2 wherein an adjusting member responsive to engine speed is provided, said adjusting member causing energization of said second electromagnet at an engine speed below a predetermined limit.

8. Apparatus as claimed in claim 2 wherein an adjusting member responsive to engine speed is provided, said adjusting member being connected to the second bi-stable switch to constitute means producing energization of said second electromagnet upon the occurrence of an engine speed greater than a predetermined value.

9. Apparatus as claimed in claim 2 wherein the closure member comprises a slide arraned in a housing for opening and closing the passage through the closure member, said slide being coupled with an armature of the second electromagnet to be displaceable with respect to said closure member over a limited distance, said slide constituting an armature of the first electromagnet.

10. Apparatus as claimed in claim 8 wherein additionally to said first and second electromagnets other electromagnets are provided, said other electromagnets being arranged to be energized one by one sequentially after the second electromagnet is energized, in response to engine speed, said other electromagnets being connected to said closure member to further open the auxiliary conduit means.

11. Apparatus as claimed in claim 9 wherein an armature of the second electromagnet has a movable stop said stop being exposed to intake manifold pressure and being displaceable upon an increase in pressure in the intake manifold in a direction away from the second electromagnet.

12. Apparatus as claimed in claim 11 wherein said adjustable stop comprises a first, piston-like body which is connected with a second piston-like body spaced from the first piston-like body, the two piston-like bodies being disposed in a housing, spring means in said housing tending to hold the second piston-like body in a given position, a space between the two piston-like bodies and within the housing communicating with the intake manifold and a space in the housing on the side of the second piston-like body remote from the first piston-like body being in communication with atmosphere.

13. Apparatus as claimed in claim 1 wherein said pressure responsive switches each comprise a housing in which diaphragm means is movable against the action of a spring disposed in a space provided in the housing and communicating with the intake manifold, while the diaphragm means has secured to it a rod supporting an electrical contact piece movable between two electrical contact members.

14. Apparatus as claimed in claim 1 wherein said auxiliary conduit means communicates with an air filter separate from an air filter communicating with said carburetor.

* * * * *